United States Patent
Dylla et al.

(10) Patent No.: US 10,429,159 B2
(45) Date of Patent: Oct. 1, 2019

(54) DEPLOYABLE AIRFOIL AIRBORNE BODY AND METHOD OF SIMULTANEOUS TRANSLATION AND ROTATION TO DEPLOY

(71) Applicant: Raytheon Company, Waltham, MA (US)

(72) Inventors: Joseph P. Dylla, Oro Valley, AZ (US); Michael J. Scolman, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 282 days.

(21) Appl. No.: 15/634,530

(22) Filed: Jun. 27, 2017

(65) Prior Publication Data

US 2018/0372464 A1     Dec. 27, 2018

(51) Int. Cl.
    *F42B 10/14*     (2006.01)
    *B64C 39/02*     (2006.01)

(52) U.S. Cl.
    CPC ............ *F42B 10/14* (2013.01); *B64C 39/024* (2013.01); *B64C 2201/102* (2013.01)

(58) Field of Classification Search
    CPC .. F42B 10/14; B64C 39/024; B64C 2201/102
    See application file for complete search history.

(56) References Cited

U.S. PATENT DOCUMENTS

| | | | |
|---|---|---|---|
| 3,990,656 A | 11/1976 | Minnich | |
| 4,364,531 A * | 12/1982 | Knoski | F42B 10/20 244/3.27 |
| 4,440,360 A | 4/1984 | Hallstrom | |
| 4,923,143 A | 5/1990 | Steuer et al. | |
| 5,141,175 A * | 8/1992 | Harris | F42B 10/14 102/384 |
| 5,671,899 A * | 9/1997 | Nicholas | B64C 3/40 244/3.28 |
| 6,758,435 B2 * | 7/2004 | Niemeyer | F42B 10/14 244/3.24 |
| 6,986,481 B2 * | 1/2006 | Fanucci | B64C 3/40 244/3.26 |

(Continued)

FOREIGN PATENT DOCUMENTS

| | | |
|---|---|---|
| EP | 3392603 A1 | 10/2018 |
| GB | 1597098 A | 9/1981 |
| JP | H07 332898 A | 12/1995 |

*Primary Examiner* — Justin M Benedik
(74) *Attorney, Agent, or Firm* — Eric A. Gifford (57) ABSTRACT

A deployable airfoil airborne body such as missiles, bombs, guided projectiles, MALDs and UAVs includes first and second rigid airfoil sections stowed end-to-end along the airborne body. The airfoil sections have first and second interior edges of equal lengths, abutting ends connected at the first and second interior edges by a free-floating pivot, a distant end of the first rigid airfoil section coupled to a fixed pivot on the airborne body, and a distant end of the second rigid airfoil section having a translation point. The first and second rigid airfoil sections are configured to rotate in opposite directions to move the translation point axially along the airborne body to abut the fixed pivot driving the free-floating pivot radially away from the airborne body to join the first and second interior edges in a deployed position transverse to the airborne body to form a rigid airfoil.

21 Claims, 10 Drawing Sheets

(56) References Cited

U.S. PATENT DOCUMENTS

| | | | | |
|---|---|---|---|---|
| 7,185,847 B1* | 3/2007 | Bouchard | ............... | F42B 10/12 |
| | | | | 244/3.28 |
| 9,086,258 B1* | 7/2015 | Vasudevan | .............. | F42B 15/01 |
| 2007/0262194 A1* | 11/2007 | Agrawal | ................. | B64C 33/02 |
| | | | | 244/11 |
| 2010/0264260 A1* | 10/2010 | Hammerquist | ........... | B64C 3/56 |
| | | | | 244/49 |

* cited by examiner

DEPLOYABLE AIRFOIL AIRBORNE BODY AND METHOD OF SIMULTANEOUS TRANSLATION AND ROTATION TO DEPLOY

GOVERNMENT LICENSE RIGHTS

This invention was made with government support under HR0011-15-C-0081 awarded by the Department of Defense. The government has certain rights in the invention.

BACKGROUND OF THE INVENTION

Field of the Invention

This invention relates to a deployable airfoil airborne body for missiles, guided projectiles, unmanned aerial vehicles (UAVs), Small Diameter Bombs (SDBs), Miniature Air-Launched Decoys (MALDs) and the like.

Description of the Related Art

Container or tube launched aerial vehicles such as missiles, guided projectiles, and UAVs require the wings to be in a stowed position along or inside the fuselage and to transition to a deployed position upon launch. The pair of wings may be stowed along the centerline of the vehicle either against or recessed within the fuselage or may be stowed on top of the vehicle. A deployment mechanism such as springs, gas springs and motors is used to deploy the wings. In most cases, these systems are configured to deploy the wings in sync. The wing's chord length is limited by the space constraints and ability to stow the wings.

U.S. Pat. No. 4,440,360 entitled "Extendable Fin" discloses a projectile or like which is fin-stabilized (spinning), an extendable fin is utilized which is intended to be retracted to within the body of the shell during firing in a barrel or the like and to be extended as soon as the shell or the like has left the barrel. The extendable fin is intended to increase the stability of the ammunition unit in the ballistic trajectory. The extendable fin consists of two fin parts supported separately in relation to each other. In their extended positions, the parts are joined together to form the fin. Each extendable fin is independently deployed in response to rotational acceleration of the projectile, which then forces the fin parts to pivot. In an embodiment, gear arcs are arranged at the rear edges of the fin parts and are located at the upper rear corners of the fin parts. When the first fin part is extended, the teeth on the two fin parts go into coaction with each other and a coordinated extending function for the fin parts is obtained.

U.S. Pat No. 4,364,531 entitled "Attachable Airfoil with Movable Control Surface" discloses an attachable airfoil for use on an airborne vehicle or payload having a plurality of joined, nestable sections that can expand from a collapsed, streamlined position adjacent the vehicle or payload to a fully extended airfoil configuration. In addition, the airfoil incorporates a moveable control surface, which by appropriate remote actuation can be utilized to provide controlled flight of the airborne vehicle or payload. Each fin contains an airfoil mount and a plurality of extendable telescopic sections secured substantially at the midpoint of the airfoil mount. These telescopic sections are extended either mechanically or pneumatically. The airfoil deployment is activated upon opening a gas valve, which pressurizes the bladder of the airfoil.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a deployable airfoil airborne body such as missiles, bombs, guided projectiles, MALDs and UAVs.

In an embodiment, the airborne body includes first and second rigid airfoil sections. These sections are stowed end-to-end along the airborne body. The sections have first and second interior edges of equal length. The abutting edges of the airfoil sections are connected at the first and second interior edges by a floating pivot. The distant end of the first rigid airfoil section is coupled to a fixed pivot on the airborne body. The distant end of the second rigid airfoil section has a translation point. The first and second rigid airfoil sections are configured to rotate in opposite directions to move the translation point axially along the airborne body to abut the fixed pivot point thus driving the floating pivot radially away from the airborne body to join the first and second interior edges in a deployed position transverse to the airborne body to form a rigid airfoil. The rigid airfoil has a chord length greater than the chord length of either airfoil section.

In one embodiment, the first and second rigid airfoil sections have different cross-sections and are the same width (chord length).

In one embodiment, the fixed pivot and the floating pivot comprise hinges, bolts, pins or a combination thereof.

In one embodiment, upon completion of the rotation the translation point is constrained from moving backwards by a locking mechanism.

In one embodiment, the airborne body has an indented groove that runs along the longitudinal axis of the airborne body constraining the first and second rigid airfoil sections to move longitudinally within the groove.

In one embodiment, a force is applied to rotate the first and second rigid airfoil sections. In one embodiment, the force is a reaction to a deployment mechanism such as a spring-loaded loading type device that acts on the translation point or a gear system that acts on the fixed pivot.

In another embodiment, the force is a reaction to a deployment or launch of the airborne vehicle.

In one embodiment, the interior edges of the first and second rigid airfoil sections have complementary surface portions that interlock to form the rigid airfoil.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a deployable airfoil airborne body such as a missile, guided projectiles, UAV, MALD and SDB. Each deployable airfoil comprises two rigid airfoil sections stowed end-to-end along the airborne body. The deployable airfoil may provide a wing, fin, canard or similar aerodynamic lifting surface for an airborne body.

Figure 1A:
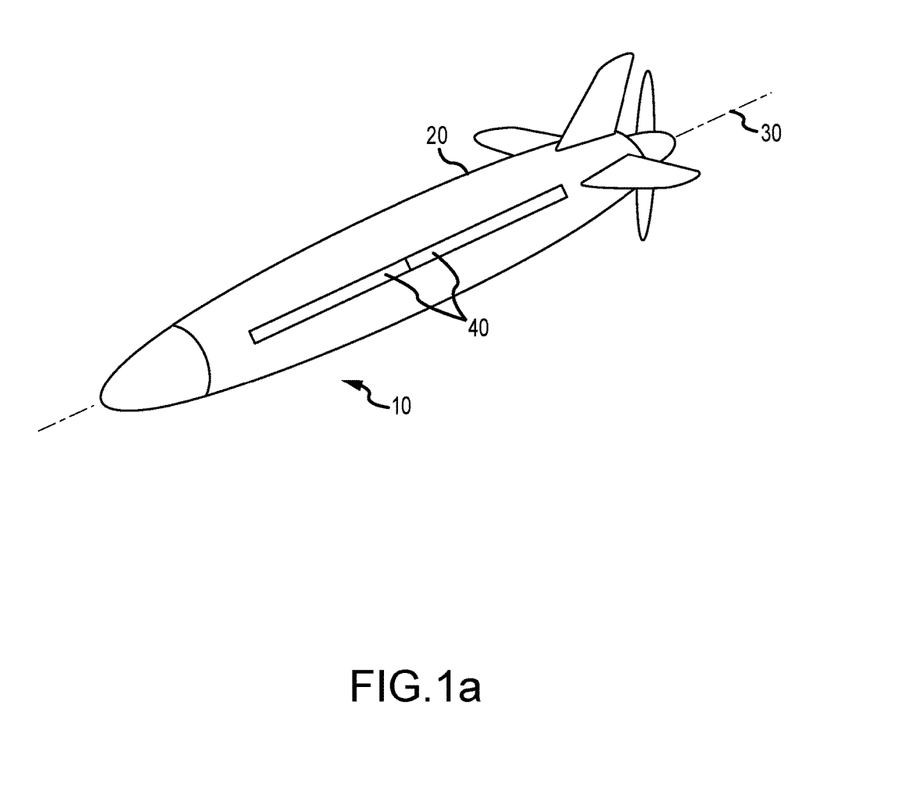
FIG. 1a-1c are perspective views of an embodiment of a deployable airfoil airborne body in the stowed, transition and deployed positions respectively.
Figure 1B:
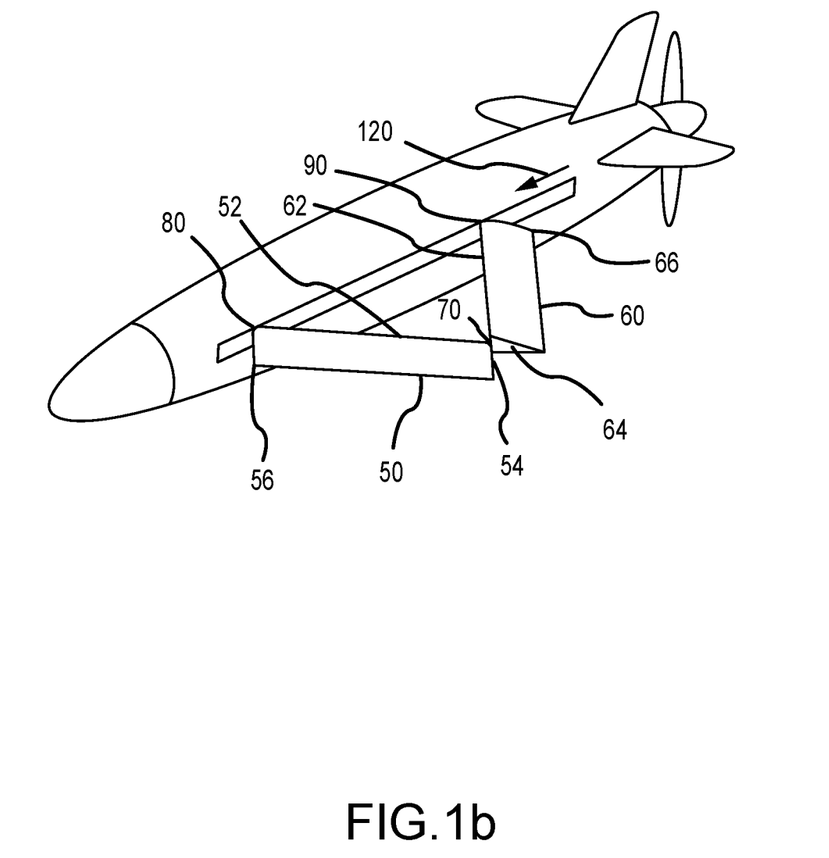
Figure 1C:
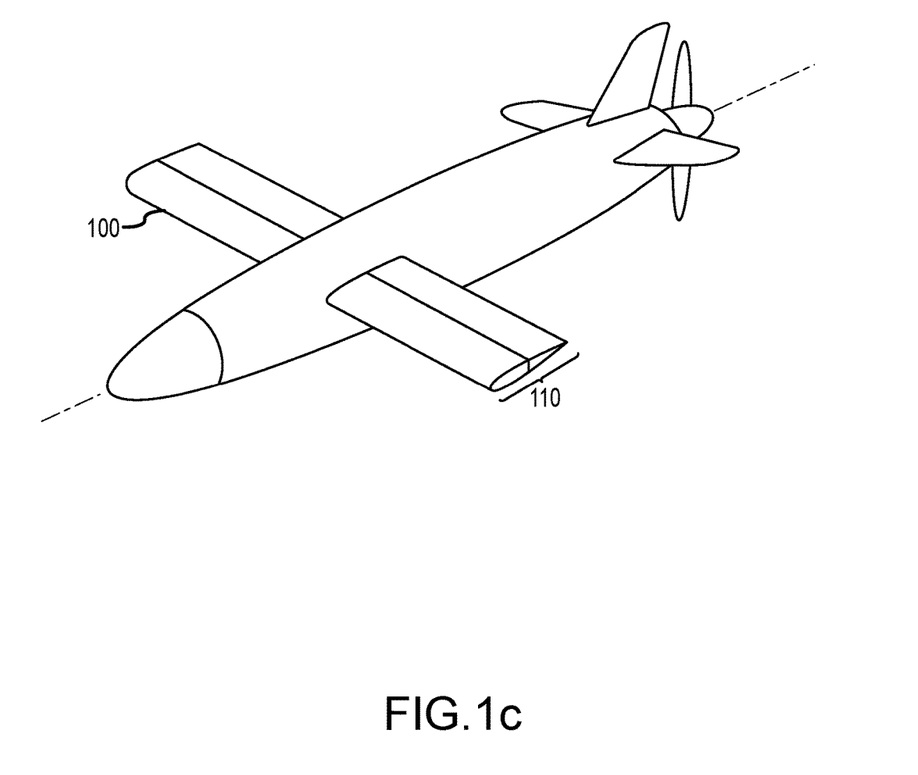

Referring now to FIGS. 1a-1c, an embodiment of a deployable airfoil airborne body 10 includes an airborne body 20 with a longitudinal axis 30. The longitudinal axis 30 extends lengthwise (nose through tail) of the airborne body 20. A pair of deployable airfoils 40 is located on opposite sides of airborne body 20.

Each deployable airfoil 40 includes first and second rigid airfoil sections 50, 60, respectively, stowed end-to-end lengthwise along the airborne body 20 in the direction of the longitudinal axis 30. The first and second airfoil sections 50, 60, respectively, are of equal length and each have an interior edge 52, 62, respectively, which when stowed is positioned along (against or recessed in) the airborne body 20. The first and second airfoil sections 50, 60, respectively, could have different cross sections (shapes and thickness) to address the different needs of the airborne body, such as lift, and drag.

The first and second airfoil sections 50, 60, respectively, each have an abutting end 54, 64, respectively, and a distant end 56, 66, respectively. The abutting ends 54, 64 are connected by a floating pivot 70 on the interior edges 52, 62, of the first and second airfoil sections 50, 60, respectively. The floating pivot 70 could be, for example, a hinge, bolt or pin. The floating pivot 70 is not fixed to the airborne body, hence the "floating" aspect. The distant end 56 of the first airfoil section 50 is couple to a fixed pivot 80 on the airborne body 20. The fixed pivot 80 could be, for example, a hinge, a bolt, pin attached to the airborne body 20 or gearbox embedded in the airborne body 20. The second airfoil section's 60 distant end 66 has a translation point 90. The translation point 90 could be, for example, the edge of the second airfoil section, a roller or a pin captured in an indented groove.

The first and second airfoil sections 50, 60, respectively, are configured to rotate in opposite directions thereby moving the translation point 90 axially (along the longitudinal axis 30) along the airborne body 20 to abut the fixed pivot 80 thereby, driving the floating pivot 70 radially (perpendicular to the longitudinal axis 30) from the airborne body 20 and towards the fixed pivot 80 to join the first and second interior edges 52, 62, respectively, in a deployed position transverse to the airborne body 20 to form a rigid airfoil 100 having a chord length 110 equal to the combined widths of the first and second airfoil sections 50, 60. The first and second interior edges 52, 62, may be formed with complementary surface portions that interlock to form the rigid airfoil 100. A locking mechanism may be provided to constrain the translation point 90 from moving away from the fixed pivot 80 to secure the rigid airfoil 100 in its deployed position.

Rotation occurs in reaction to application of a force 120, either directly or indirectly, on translation point 90 that drives the translation point 90 axially toward the fixed pivot 80. This force 120 may be in reaction to deployment or launch of the airborne body. For example, ignition of a rocket motor or firing from a gun may produce such a force. Alternately, the force 120 may be produced by a deployment mechanism such as a spring-loaded mechanism that acts directly on the translation point 90 or a gear system that acts of the fixed pivot 80.

Figure 2A:
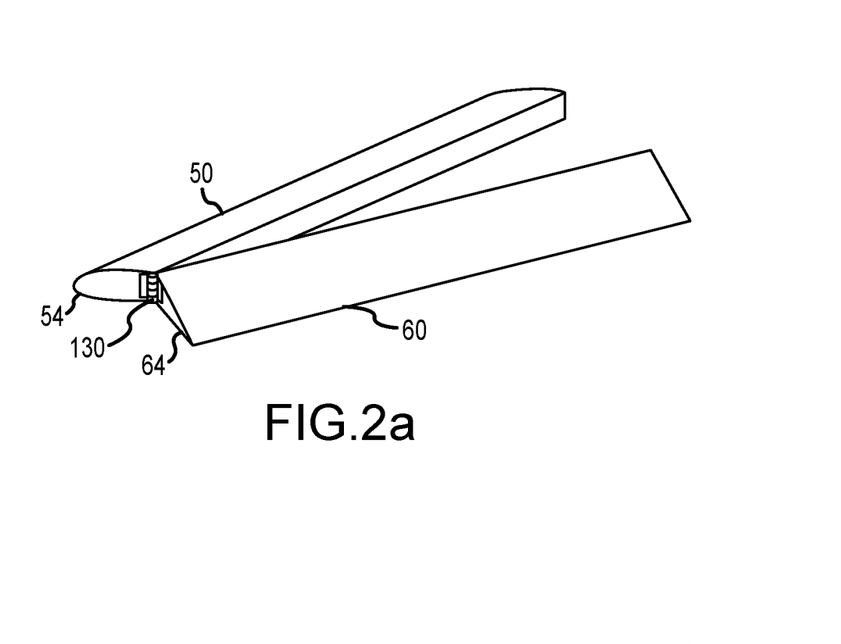
FIG. 2a-2b are different views of an embodiment of the floating pivot.
Figure 2B:
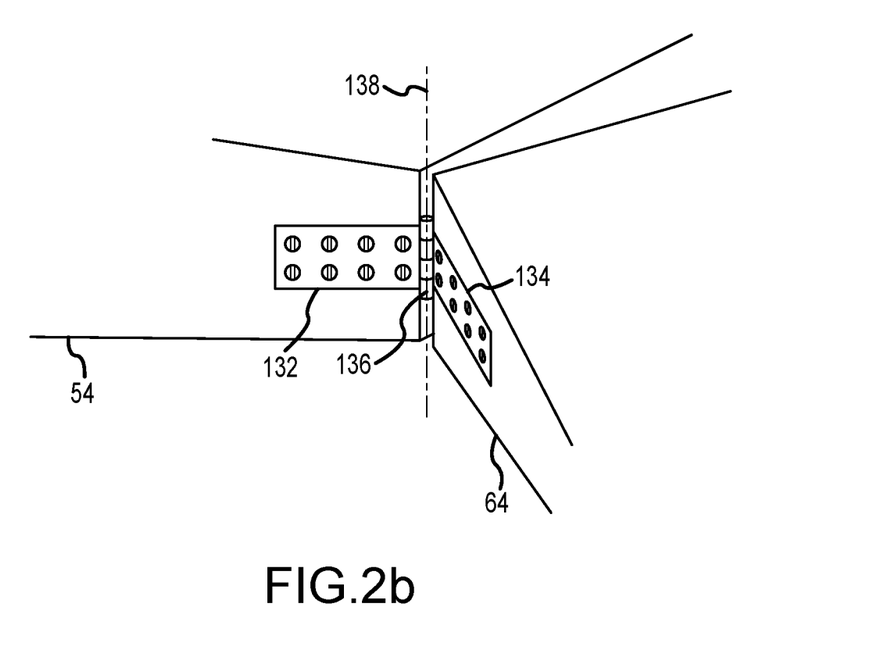

An embodiment of the floating pivot that connects the abutting edges of the first and second rigid airfoils is shown in FIGS. 2a-2b. The embodiment shows the floating pivot connecting the first and second rigid airfoils 50, 60 may be a hinge 130 wherein the abutting surfaces 54, 64 of the first and second airfoils 50, 60 are held together by a two interlocking metal leaves 132, 134 held by a pin 136 about which they pivot allowing the airfoils 50, 60 to rotate relative to each other about a fixed axis 138 of rotation.

Figure 3:
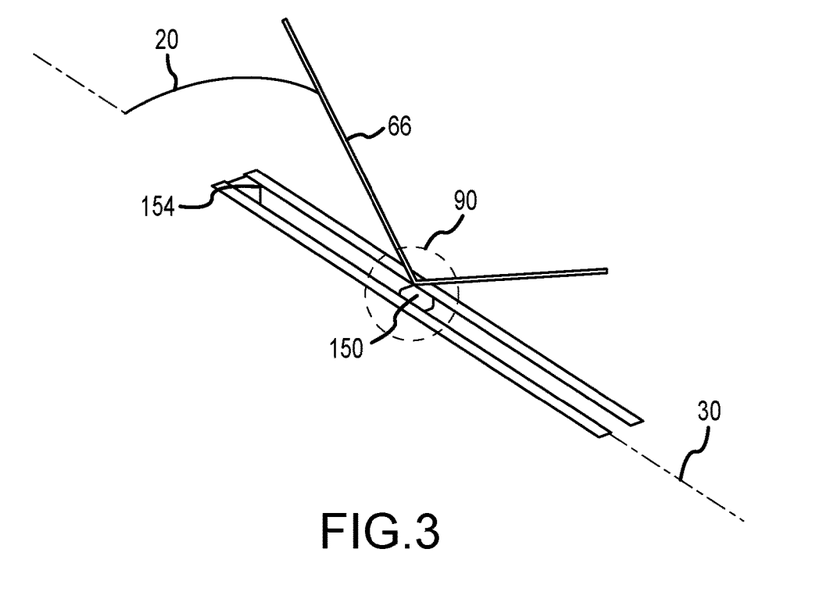
FIG. 3 is a perspective view of an embodiment of the translation point.

FIG. 3 depicts an embodiment of the translation point 90. Translation point 90 comprises a pin 150 captured in an indented groove 154. The indented groove 154 is a depression along the longitudinal axis 30 of the airborne body 20 to prevent lateral movement (perpendicular to the longitudinal axis 30). The pin 150 is attached to the distant end 66 of the second airfoil. The indented groove 154 depth is such that the second airfoil is flush with the airborne body 20 allowing the pin 150 to be hidden; thus causing no interference with the first and second airfoils alignment. In an alternate embodiment, a roller and socket is used in place of the pin.

Figures 4A, 4B:
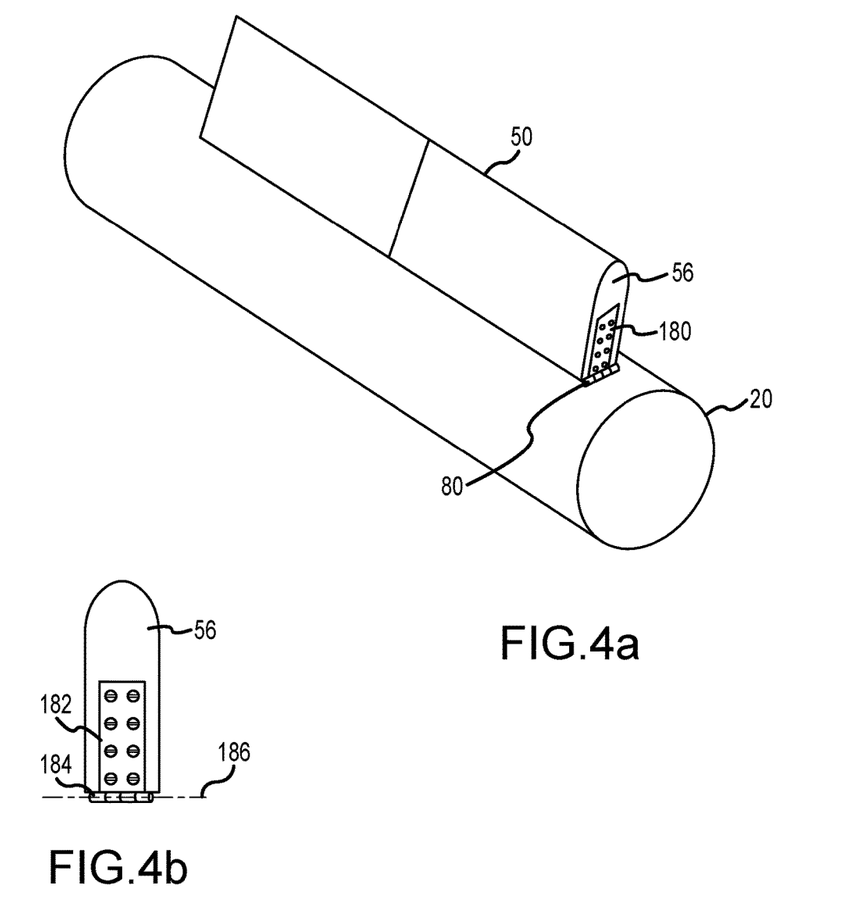
FIG. 4a-4b are different views of an embodiment of the fixed pivot.

FIGS. 4a and 4b show an embodiment of the fixed pivot connecting the first rigid airfoil 50 and the airborne body 20. The fixed pivot 80 includes a hinge 180 wherein the first rigid airfoil's distant end 56 and the airborne body 20 are held together by two interlocking metal leaves 182 held by a pin 184 about which they pivot allowing the first rigid airfoil 50 to rotate about a fixed axis 186 of rotation. The hinge 180 is fixed to the airborne body 20.

Figures 5A, 5B:
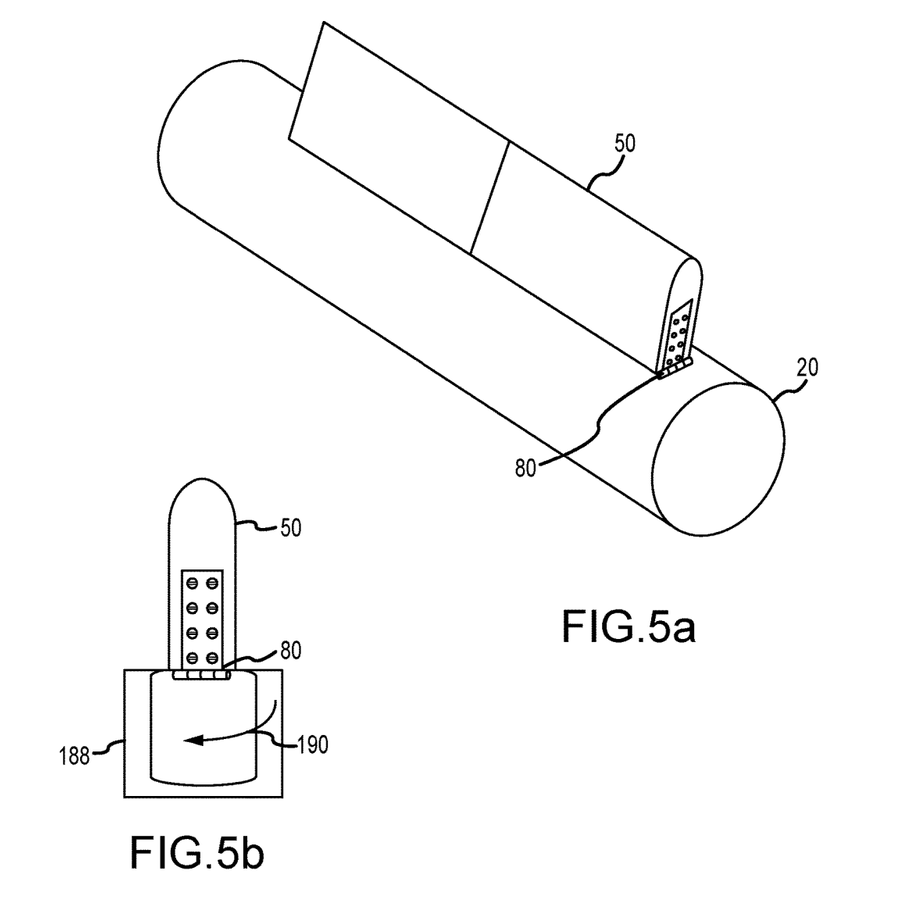
FIG. 5a-5b are different views of another embodiment of the fixed pivot.

FIGS. 5a and 5b show an embodiment of the fixed pivot 80 connecting the first rigid airfoil 50 and the airborne body 20 may via a gearbox assembly 188. The gearbox assembly 188 is embedded into the airborne body 20 and may provide additional control features such as rotation 190 allowing adjustment to the airfoils pitch and yaw.

Figure 6:
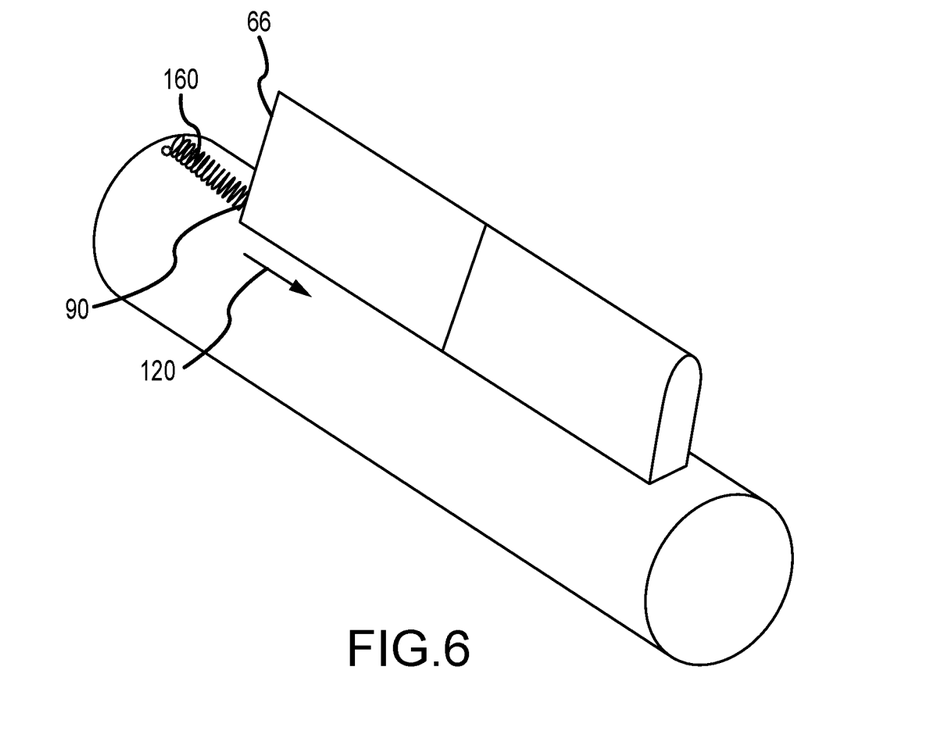
FIG. 6 is a perspective view of an embodiment of a deployment mechanism.

FIG. 6 shows an embodiment of the deployment mechanism. The deployment mechanism 160 is shown as a spring, which is connected directly or indirectly to the second airfoil's distant end 66. Upon release of the spring, a force 120 is produced and acts directly on the translation point 90.

Figure 7A:
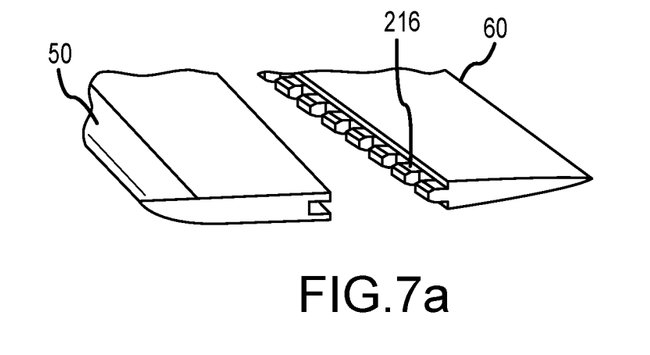
FIG. 7a-7c are different views of a complementary surface portions that interlock to form the rigid airfoil.
Figure 7B:
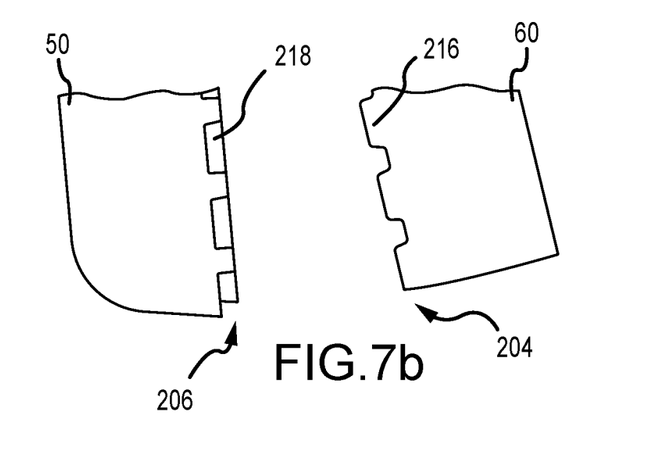
Figure 7C:
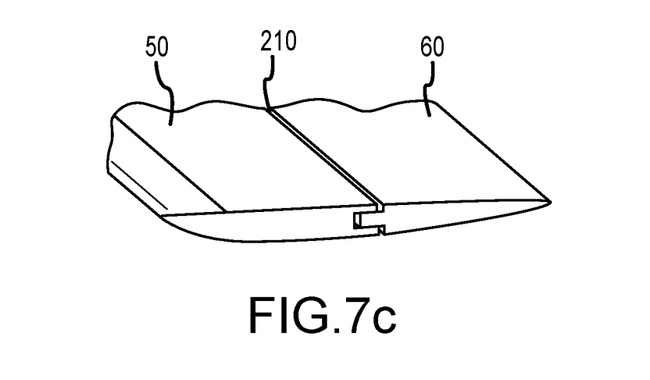

Referring now to FIGS. 7a-7c, in an embodiment, first and second airfoil sections 50, 60 are formed with complementary tongue and groove surface portions 204 and 206 formed along the first and second interior edges that are progressively engaged as the first and second airfoil sections 50, 60 pivot away from said airborne body. A single contiguous tongue and groove mechanism provides vertical stability at an interface 210 between the airfoil sections to loads normal to the deployable airfoil airborne body but does not provide sheer stability axially along interface 210. Both are critical.

In a preferred embodiment, the tongue and groove surface portions 204 and 206 are segmented so that individual tongue segments 216 are nested within complementary groove segments 218. The tongue segments 216 are surrounded on four sides, above and below and interior and exterior, by the groove segments 218 to interlock and form the single interlocked wing to provide both vertical stability at the interface 210 between the first and second wing sections to loads normal to the wing and sheer stability axially along the interface 210. The segmented tongue and groove in essence forms a two-dimensional zipper, providing the vertical stability of the basic tongue and groove structure and the sheer stability of the segmented structure.

Figure 8:
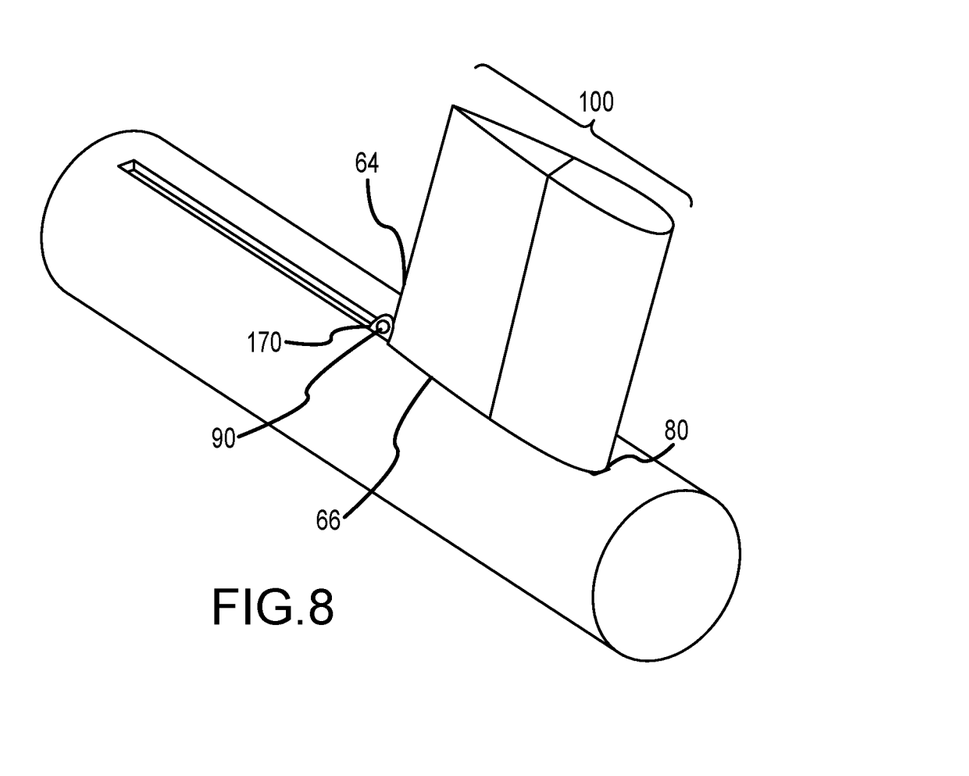
FIG. 8 is a perspective view of a deployed rigid airfoil with a locking mechanism.

Referring to FIG. 8, an embodiment of a locking mechanism 170 is shown. A locking mechanism 170 is shown as a bolt constraining the translation point 90 from moving away from the fixed pivot 80 to secure the rigid airfoil 100 in its deployed position. The locking mechanism 170 is mounted at the interior edge 64 of the second airfoil's distant end 66. In one embodiment, the locking mechanism is a recessed pin.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A deployable airfoil airborne body, comprising:
   an airborne body; and
   first and second rigid airfoil sections stowed end-to-end along the airborne body, which have first and second interior edges of equal lengths, abutting ends connected at the first and second interior edges by a floating pivot, a distant end of the first rigid airfoil section coupled to a fixed pivot on the airborne body, and a distant end of the second rigid airfoil section having a translation point, said first and second rigid air foil sections configured to rotate in opposite directions to move the translation point axially along the airborne body to abut the fixed pivot driving the floating pivot radially away from the airborne body to join the first and second interior edges in a deployed position transverse to the airborne body to form a rigid airfoil.

2. The deployable airfoil airborne body of claim 1, wherein said first and second interior edges having complementary surface portions that interlock to form the rigid airfoil.

3. A deployable airfoil airborne body of claim 1, wherein the first and second airfoil sections have different cross-sections.

4. A deployable airfoil airborne body of claim 1, wherein the first and second airfoil sections have the same width.

5. A deployable airfoil airborne body of claim 1, wherein the fixed pivot is selected from a hinge, a bolt, a pin or a combination thereof attached to the airborne body.

6. A deployable airfoil airborne body of claim 1, wherein the floating pivot is selected from a hinge, a bolt, a pin or a combination thereof.

7. A deployable airfoil airborne body of claim 1, wherein upon completion of the rotation the translation point is constrained from moving away from the fixed pivot by a locking mechanism.

8. A deployable airfoil airborne body comprising:
   an airborne body with a longitudinal axis running the length of the airborne body;
   first and second rigid airfoil sections stowed end-to-end along the airborne body, said first and second rigid airfoils having interior edges of equal lengths, abutting ends and distant ends positioned along the airborne body;
   a fixed pivot on the airborne body coupled to the distant end of the first rigid airfoil section;
   a floating pivot that connects the abutting ends of the first and second rigid airfoil sections; and
   a translation point at the distant end of the second rigid airfoil section constrained to move along the longitudinal axis towards the fixed pivot;
   said first and second rigid airfoil sections configured to, in response to a force applied to said translation point along the longitudinal axis, rotate in opposite directions to move the translation point axially along the airborne body to abut the fixed pivot driving the floating pivot radially away from the airborne body to join the first and second interior edges in a deployed position transverse to the airborne body to form a rigid airfoil.

9. A deployable airfoil airborne body of claim 8, wherein the airborne body comprises an indented groove that runs along the longitudinal axis, wherein the translation point on the second rigid airfoil section is constrained to move longitudinally by the indented groove.

10. A deployable airfoil airborne body of claim 9 wherein the indented groove further serves as a storage location for the first and second rigid airfoil sections before they are deployed.

11. The deployable airfoil airborne body of claim 8, wherein said first and second interior edges having complementary surface portions that interlock and form the rigid airfoil.

12. A deployable airfoil airborne body of claim 8, wherein the first and second rigid airfoils have different cross-sections.

13. A deployable airfoil airborne body of claim 8, wherein the first and second rigid airfoils have the same length and width.

14. A deployable airfoil airborne body of claim 8, wherein the fixed pivot is selected from a hinge, a bolt, a pin or a combination thereof attached to the airborne body.

15. A deployable airfoil airborne body of claim 8, wherein the floating pivot is selected from a hinge, a bolt, a pin or a combination thereof.

16. A deployable airfoil airborne body of claim 8, wherein upon completion of the rotation the translation point is constrained from moving away from the fixed pivot by a locking mechanism.

17. A deployable airfoil airborne body of claim 8, wherein the force is created by a deployment mechanism.

18. A deployable airfoil airborne body of claim 17, wherein the deployment mechanism is selected from a spring loading device, actuator, screw mechanism, gearbox or a combination thereof.

19. A method of deploying an airfoil for use with an airborne body, comprising:
   stowing first and second rigid airfoil sections end-to-end along the airborne body, said first and second rigid air foil sections having first and second interior edges of equal lengths, respectively,
   connecting abutting ends of the first and second rigid airfoil sections at the first and second interior edges by a floating pivot,
   coupling a distant end of the first rigid airfoil section to a fixed pivot on the airborne body, and a distant end of the second rigid air foil section having a translation point,
   rotating said first and second rigid airfoil sections in opposite directions moving the translation point axially along the airborne body to abut the fixed pivot driving the floating pivot radially away from the airborne body, and joining the first and second interior edges in a deployed position transverse to the airborne body to form a rigid airfoil.

20. The method of claim 19, wherein said first and second interior edges having complementary surface portions, further comprising interlocking the complementary surface portions to form the rigid airfoil.

21. The method of claim 19 further comprising upon completion of the rotation constraining the translation point from moving away from the fixed pivot.

* * * * *